Feb. 26, 1957 T. B. H. VOGT 2,782,524
MAGNETIZED SPOT LEVELS
Filed Dec. 7, 1955

INVENTOR.
T.B.H. VOGT
BY J. Ledermann
ATTORNEY

United States Patent Office 2,782,524
Patented Feb. 26, 1957

2,782,524

MAGNETIZED SPOT LEVELS

Theodore B. H. Vogt, Fair Lawn, N. J.

Application December 7, 1955, Serial No. 551,670

1 Claim. (Cl. 33—212)

This invention relates to spot levels, that is, a level in which the exposed transparent surface of the receptacle containing the liquid and the bubble is flat and horizontal, and additionally circular, having means for indicating that the bubble is positioned in the center of the receptacle under the exposed surface when the level rests on a true horizontal surface, and the main object of the invention is the provision of certain new and useful improvements whereby the utility and application of the level are enhanced.

Another object of the invention is the provision of a wholly or partly magnetized base for the level so that it may cling to any metallic surface such as, for example, the surface of a machine or a work piece to be worked upon in a machine.

The above as well as additional and more specific objects will be clarified in the following description wherein reference numerals refer to like-numbered parts in the accompanying drawing. It is to be noted that the drawing is intended solely for the purpose of illustration and that it is therefore neither desired nor intended to limit the invention necessarily to any or all of the exact details of construction shown except insofar as they may be deemed essential to the invention.

Referring briefly to the drawing.

Figure 1:
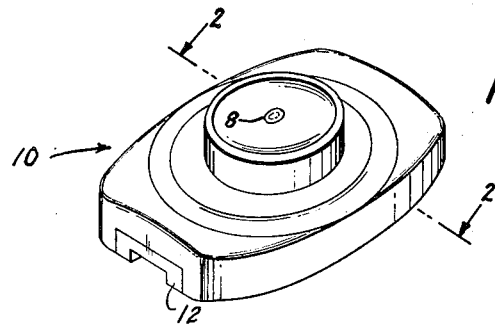
Fig. 1 is a perspective view of a spot level embodying the improvements of the present invention.
Figure 2:
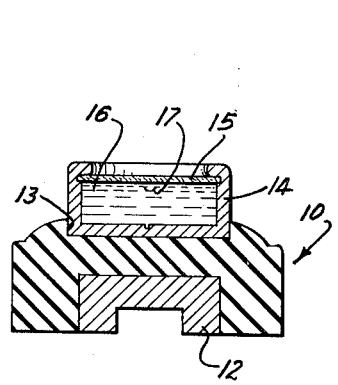
Fig. 2 is a sectional view taken on the line 2—2 of Fig. 1.
Figure 3:
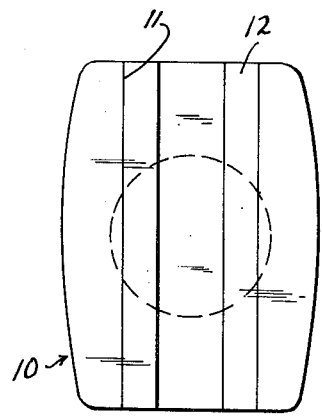
Fig. 3 is a bottom plan view of the level.
Figure 4:
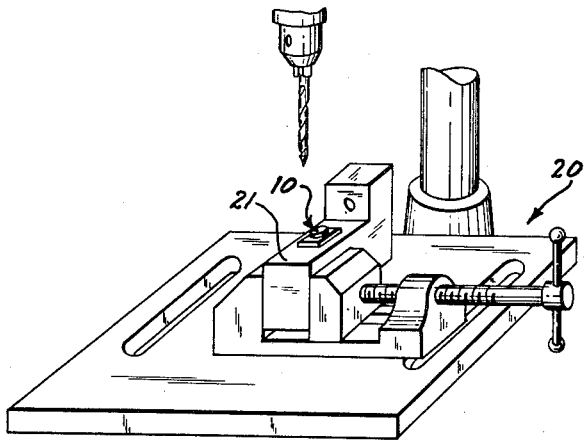
Fig. 4 is a perspective view of a portion of a machine tool showing, merely by way of example, an application of the level.

Referring in detail to the drawing, the numeral 10 indicates the housing of the level, which is approximately rectangular in outline and formed of a light-weight plastic material or the like. A longitudinal groove 11 is provided in the underside of the base of the housing, in which an inverted channel-shaped magnetized steel insert is locked, shown at 12.

A circular recess 13 is formed in the top of the housing 10, in which a cylindrical shell 14 is secured. A transparent disc 15 is secured in the upper circumferential edge of the shell 14, thus providing a compartment 16 which is nearly filled with a liquid and contains an air bubble 17. A circle 18 is inscribed on the disc 15 about the center thereof, preferably of a larger diameter than that of the bubble so that when the level is set on a true horizontal surface the bubble will be positioned directly below and concentrically within the circle 18.

Additionally, the floor 19 is provided with a suitable indicating means in axial alignment with the circle 18, such as, for example, an indentation 19a. Thus, the bubble will lie in alignment with the indentation 19a also when the level is truly horizontal.

The numeral 20 represents a machine tool in which a work piece 21, also metallic, is positioned and being worked upon. By mounting the level on top of the work piece, for example, as shown, and assuming that the work piece is to be kept truly horizontal during the operation thereon, the level will cling to the piece throughout the operation and will, moreover, indicate to the operator whether the work piece remains horizontal throughout the duration of the operation. This is, of course, a single example of the many possible applications of the level.

I claim:

A level of the class described comprising a lightweight non-magnetic housing having a flat base and having a cylindrical shell imbedded in the top thereof, the axis of said shell being at right angles to said base, said shell having a floor and having a transparent disc spaced upward from the floor parallel with said base, said shell between said floor and said disc containing a liquid nearly filling the same but also containing an air bubble of small diameter whereby when said base is set on a true horizontal surface said bubble will be positioned against said disc in the center thereof, said base having a permanently magnetized steel member therein having at least a portion thereof exposed through the undersurface of the base, said disc having a circle inscribed thereon in axial alignment therewith and having a greater diameter than the bubble, said floor having a detent therein in axial alignment with said circle, said magnetized member comprising an inverted channel member, said housing having a longitudinal cannel through the underside thereof, said inverted channel member registering in said longitudinal channel with the edges of the two flanges of the channel member lying in the plane of and flush with said flat base.

References Cited in the file of this patent

UNITED STATES PATENTS

| | | |
|---|---|---|
| 2,211,201 | Fell | Aug. 13, 1940 |
| 2,356,311 | Geier | Aug. 22, 1944 |
| 2,535,791 | Fluke | Dec. 26, 1950 |
| 2,695,949 | Ashwill | Nov. 30, 1954 |